United States Patent [19]

Hickey

[11] Patent Number: 5,541,675
[45] Date of Patent: Jul. 30, 1996

[54] SHOOTING GLASSES

[76] Inventor: Douglas G. Hickey, 736 Heltman Ave., Ashland, Ohio 44805

[21] Appl. No.: 413,004

[22] Filed: Mar. 29, 1995

[51] Int. Cl.$^6$ .............................. G02C 7/16; B64D 1/04
[52] U.S. Cl. .................. 351/45; 351/46; 89/1.34
[58] Field of Search .................. 351/41, 45, 46; 89/1.34; 102/504

[56] References Cited

U.S. PATENT DOCUMENTS 5,444,501  8/1995  Aloi et al. ............................ 351/45

FOREIGN PATENT DOCUMENTS 893994  of 1953  Germany ........................ 351/46

*Primary Examiner*—William L. Sikes
*Assistant Examiner*—Huy Mai

[57] ABSTRACT

The present invention relates to a pair of eyeglasses which can be used in conjunction with shooting. The glasses enable a shooter to take proper aim at a target without having to close one eye. In the broadest context, the present invention includes a pair of eyeglasses wherein one of the lenses is opaque and the other lens is opaque with the exception of a small aperture. The aperture is the sighting aperture which enables the shooter to focus on his or her target.

4 Claims, 4 Drawing Sheets

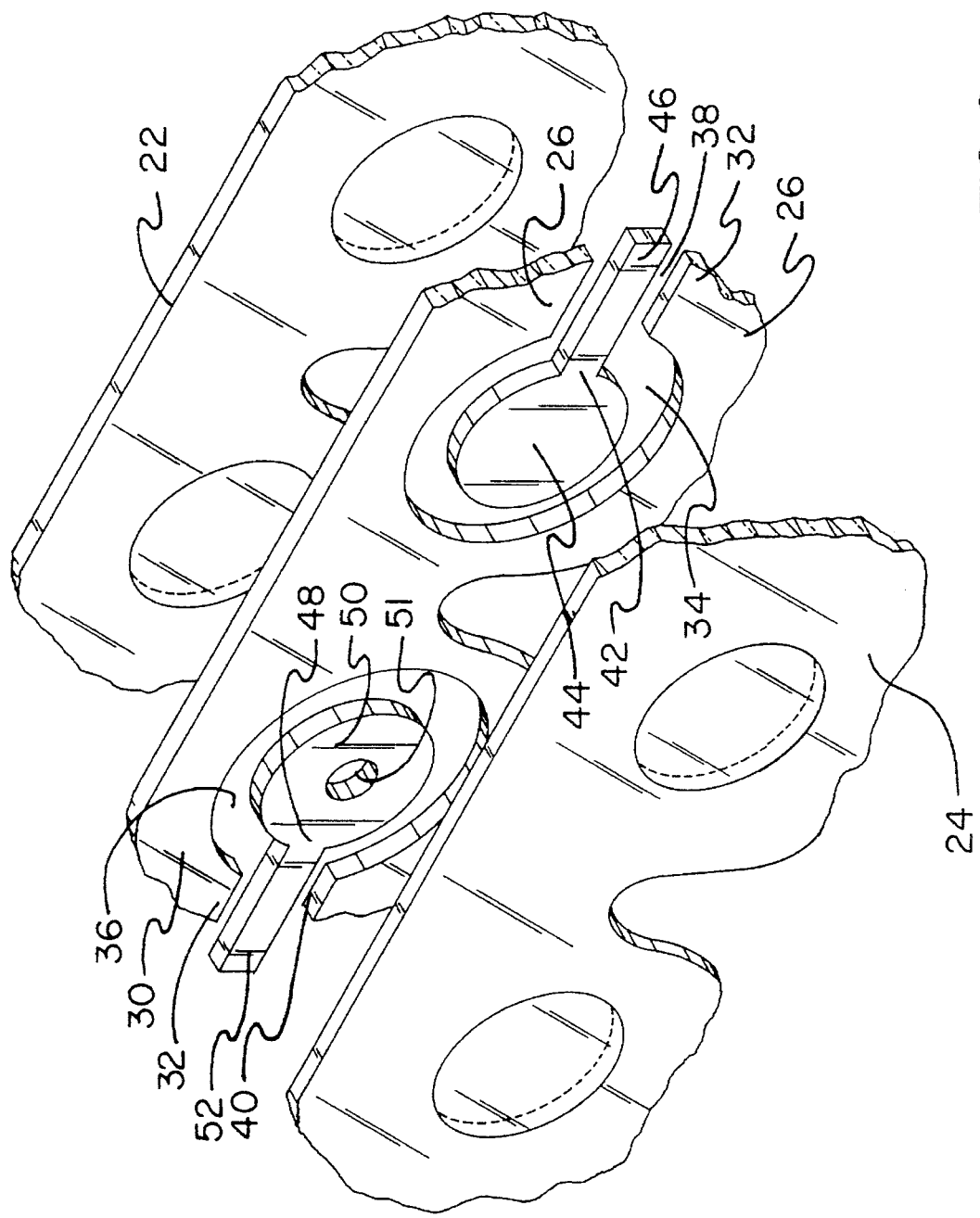

SHOOTING GLASSES

BACKGROUND OF THE INVENTION

1. Field of the Invention

The present invention relates to shooting glasses and more particularly pertains to shooting glasses which facilitate aim.

2. Description of the Prior Art

The use of glasses are known in the prior art. More specifically, eyeglasses heretofore devised and utilized for the purpose of improving sight are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,839,924 to Laurence a shooter's hat having flexible side blinder attachments.

U.S. Pat. No. 5,123,116 to Roth discloses a wrestling blinder.

U.S. Pat. No. 5,165,698 to Vanderhye discloses a reflex developing kit and procedure.

U.S. Pat. No. 5,016,999 to Williams discloses discrete lens eyeglasses.

U.S. Pat. No. 4,298,991 to Recenello discloses peripheral view blinders.

Lastly, U.S. Pat. No. 4,915,495 to Takeuchi discloses special lens for eyeglasses.

In this respect, the shooting glasses according to the present invention substantially depart from the conventional concepts and designs of the prior art, and in doing so provide an apparatus primarily developed for the purpose of improving aim.

Therefore, it can be appreciated that there exists a continuing need for new and improved shooting glasses which can be used for improving aim. In this regard, the present invention substantially fulfills this need.

SUMMARY OF THE INVENTION

In view of the foregoing disadvantages inherent in the known types of eyeglasses now present in the prior art, the present invention provides improved shooting glasses. As such, the general purpose of the present invention, which will be described subsequently in greater detail, is to provide new and improved shooting glasses and method which has all the advantages of the prior art and none of the disadvantages.

To attain this, the present invention provides, in the preferred embodiment, a lens which is comprised of three components, a rearmost component, a foremost component and an intermediate component. These components are placed together in the form of a sandwich with each of the components having a first and a second side. Furthermore, each of the sides has an upper edge, a lower edge and an outermost edge. A circular aperture with a diameter is formed within the second side of the intermediate lens component. A passage leading from the outermost edge of the first side lens component to the circular aperture of the first side is formed within the first side of the intermediate lens component. Likewise, a passage is formed leading from the outermost edge of the second side lens component to the circular aperture of the second side. An opaque paddle is employed within the glasses for the purpose of obstructing the user's vision. The opaque member has a circular portion and a handle portion. The paddle member is positioned within the first side of the intermediate lens component. The diameter of the circular portion of the paddle member is substantially smaller than the diameter of the circular aperture. The opaque paddle is positioned such that the circular portion is disposed within the circular aperture and the handle portion is positioned within the passage. Thus, the opaque paddle member can be slidably positioned within the circular aperture by way of the handle portion. This allows a user to select the proper position for the paddle in order to obstruct their vision. The handle portion of the paddle would extend outward from the side of the glasses such that the handle could be grasped by a user's hand. An apertured paddle member which has a circular portion with an aperture formed therein and a handle portion is also employed within the glasses. The apertured paddle is also of an opaque material with the exception of the aperture. The apertured paddle member is positioned within the second side of the intermediate lens component. The diameter of the circular portion of the apertured paddle member is smaller than the diameter of the circular aperture. The apertured paddle is positioned such that the circular portion is disposed within the circular aperture and the handle portion is positioned within he passage. Thus, as with the opaque paddle, the apertured paddle member is slidably positionable within the circular aperture by way of the handle portion. As a result, the aperture within the paddle can be positioned such that a user can see out of only this aperture.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved shooting glasses which have all the advantages of the prior art glasses and none of the disadvantages.

It is another object of the present invention to provide new and improved shooting glasses which may be easily and efficiently manufactured and marketed.

It is a further object of the present invention to provide new and improved shooting glasses which are of durable and reliable constructions.

An even further object of the present invention is to provide new and improved shooting glasses which are susceptible of a low cost of manufacture with regard to both materials and labor, and which accordingly are then susceptible of low prices of sale to the consuming public, thereby making such shooting glasses economically available to the buying public.

Still yet another object of the present invention is to provide new and improved shooting glasses which provide in the apparatuses and methods of the prior art some of the advantages thereof, while simultaneously overcoming some of the disadvantages normally associated therewith.

Even still another object of the present invention is to provide glasses which improve a user's aim.

Lastly, it is an object of the present invention to provide a pair of eyeglasses which can be used in conjunction with shooting. The glasses enable a shooter to take proper aim at a target without having to close one eye. In the broadest context, the present invention includes a pair of eyeglasses wherein one of the lenses is opaque and the other lens is opaque with the exception of a small aperture. The aperture is the sighting aperture which enables the shooter to focus on his or her target. Details as to the various components of the invention and the manner in which they interrelate will be described in greater detail hereinafter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a view of the various components of the glasses.

The same reference numerals refer to the same parts through the various Figures.

DESCRIPTION OF THE PREFERRED EMBODIMENT

Figure 1:
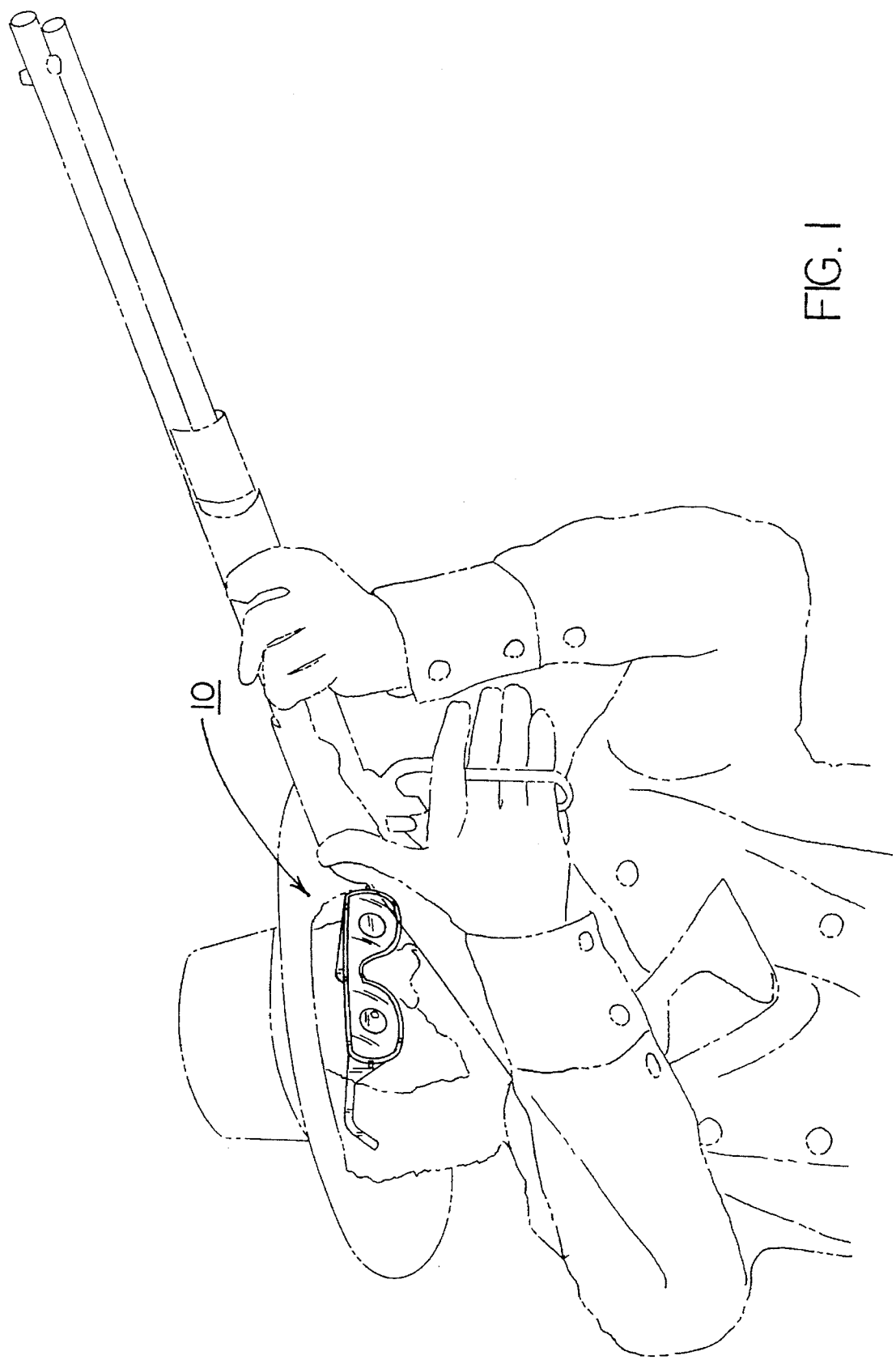
FIG. 1 is a perspective view of the preferred embodiment of the shooting glasses constructed in accordance with the principles of the present invention.
Figure 2:
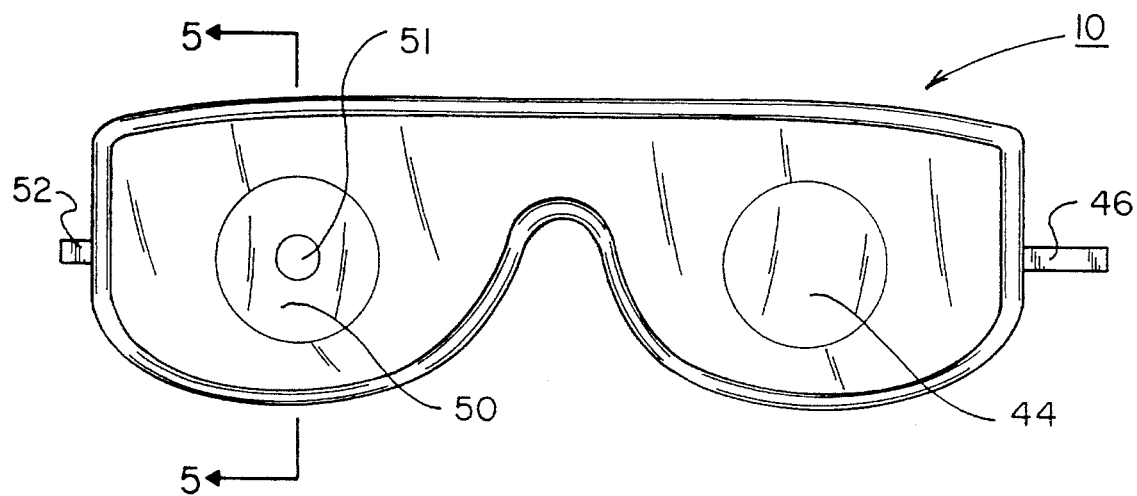
FIG. 2 is a front elevational view of the glasses in accordance with the present invention.
Figure 3:
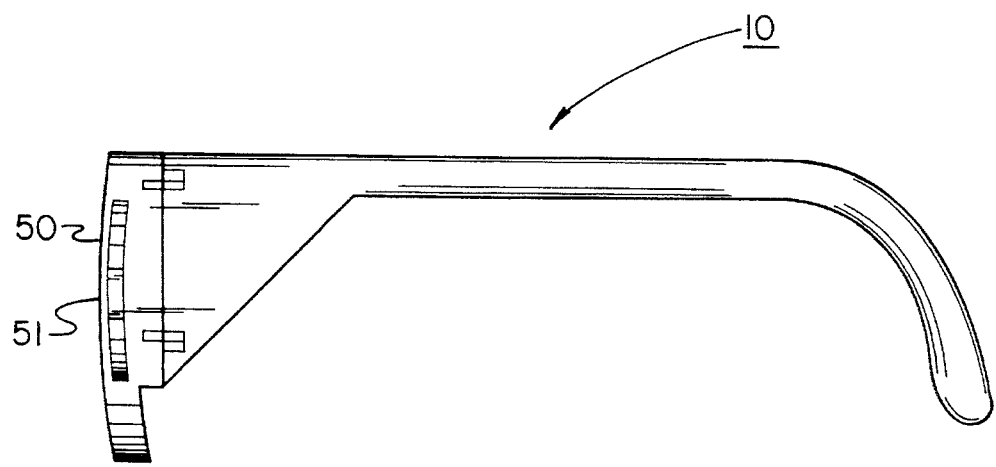
FIG. 3 is a side view of the glasses in accordance with the present invention.
Figure 4:
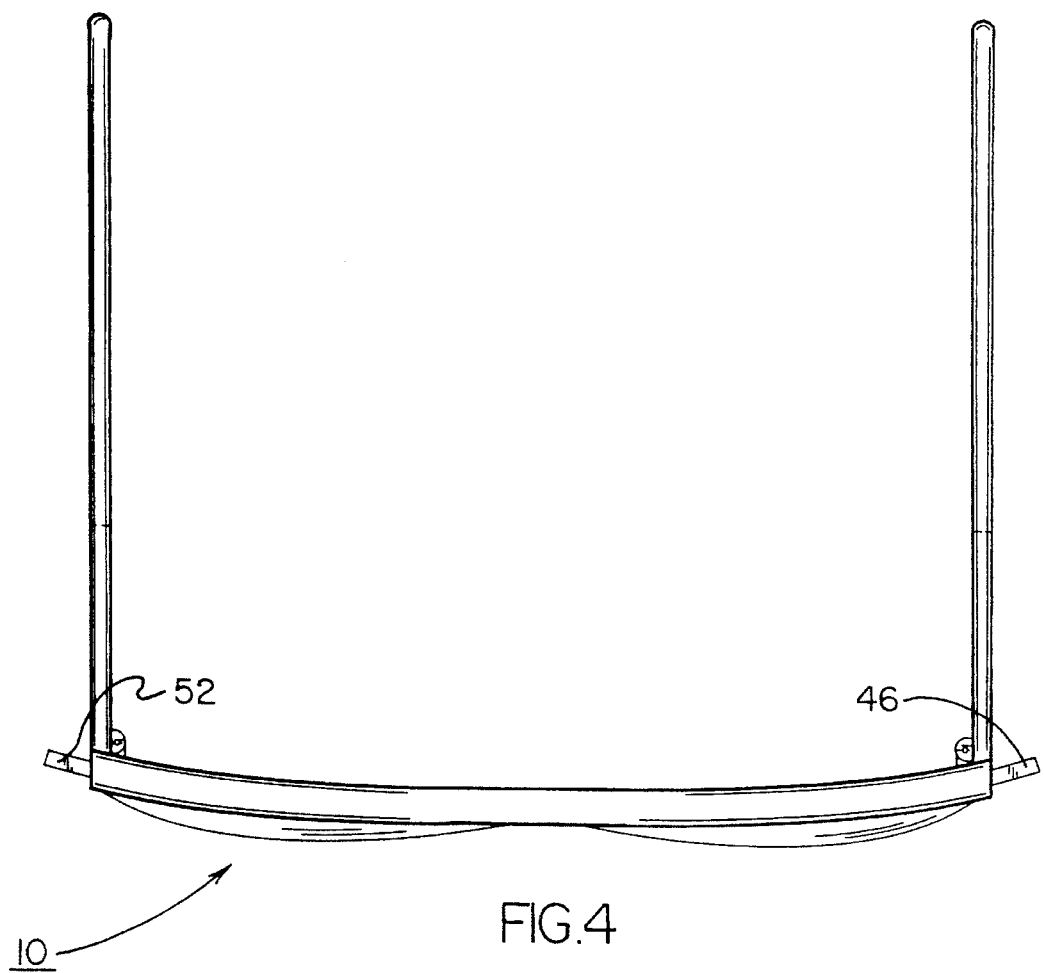
FIG. 4 is a top view of the glasses in accordance with the present invention.
Figure 5:
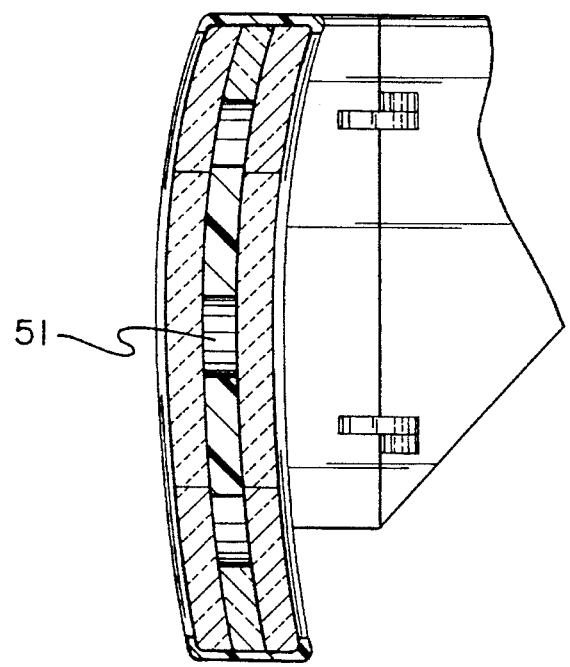
FIG. 5 is a view taken along line 5—5 of FIG. 2.

With reference now to the drawings, and in particular to FIG. 1 thereof, the preferred embodiment of the new and improved shooting glasses embodying the principles and concepts of the present invention and generally designated by the reference numeral 10 will be described.

The present invention relates to a pair of eyeglasses which can be used in conjunction with shooting. The glasses enable a shooter to take proper aim at a target without having to close one eye. In the broadest context, the present invention includes a pair of eyeglasses wherein one of the lenses is opaque and the other lens is opaque with the exception of a small aperture. The aperture is the sighting aperture which enables the shooter to focus on his or her target. Details as to the various components of the invention, and the manner in which they interrelate, will be described in greater detail hereinafter.

In the preferred embodiment, as can be seen in FIGS. 1–6, the lens is comprised of there components, a rearmost component 22, a foremost component 24 and an intermediate component 26. These components are placed together in the form of a sandwich with each of the components having a first side 28 and a second side 30. Furthermore, each of the sides has an upper edge a lower edge and an outermost edge 32.

A circular aperture 34 with a diameter is formed within the first side 28 of the intermediate lens component. Likewise, a circular aperture 36 having a diameter is formed within the second side of the intermediate lens component. A passage 38 leading from the outermost edge 32 of the first side 28 lens component to the circular aperture 34 of the first side 28 is formed within the first side 28 of the intermediate lens component. Likewise, a passage 40 is formed leading from the outermost edge 32 of the second side 30 lens component to the circular aperture 36 of the second side 30.

An opaque paddle 42 is employed within the glasses for the purpose of obstructing the user's vision. The opaque member has a circular portion 44 and a handle 46 portion. The paddle member is positioned within the first side 28 of the intermediate lens component. The diameter of the circular portion 44 of the paddle member is substantially smaller than the diameter of the circular aperture 34. The opaque paddle 42 is positioned such that the circular portion 44 is disposed within the circular aperture 34 and the handle 46 portion is positioned within the passage 38. Thus, the opaque paddle 42 member can be slidably positioned within the circular aperture 34 by way of the handle 46 portion. This allows a user to select the proper position for the paddle in order to obstruct his or her vision. The handle portion of the paddle would extend outwardly from the side of the glasses such that the handle could be grasped by a user's hand.

An apertured paddle 48 member which has a circular portion 50 with an aperture 51 formed therein and a handle portion 52 is also employed within the glasses. The apertured paddle 48 is also of an opaque material with the exception of the aperture. The apertured paddle 48 member is positioned within the second side 30 of the intermediate lens component. The diameter of the circular portion 50 of the apertured paddle 48 member is smaller than the diameter of the circular aperture 36. the apertured paddle 48 is positioned such that the circular portion 50 is disposed within the circular aperture 36 and the handle portion 52 is positioned within the passage 40. Thus, as with the opaque paddle 42, the apertured paddle 48 member is slidably positionable within the circular aperture 36 by way of the handle portion 52. As a result, the aperture within the paddle can be positioned such that a user can see out of only this aperture.

In all other respects, the glasses of the present invention are like a pair of conventional eyeglasses. In use, a user places the glasses on his or her face. The manner in which the user operates a gun will determine which side of the glasses employs the opaque paddle 42 and which side employs the apertured paddle 48. In most instances, a right-handed user will want the apertured paddle 48 on the right side and the opaque paddle 42 on the left. In any case, each of the paddles can be laterally adjusted in order to accommodate a user's face. The objective being that one eye is covered by the opaque paddle 42, and the other eye has vision only through the aperture within the apertured paddle 48. In addition to adjusting for various facial dimensions, the paddles can be adjusted depending upon the type of weapon employed. For example, the paddle positioning would need to be altered when a user changes from a shotgun to a handgun.

Thus what has been described are eyeglasses which are worn when sighting firearms for a long period of time to reduce the eye strain and fatigue. The eyeglasses have opaque lenses which prevent viewing through them except for a tiny opening of about ⅛ inch in diameter on the side that is used for sighting. They are made of plastic, mounted on suitable frames, or perhaps in clip-on form which are placed over prescription glasses. Best results are obtained from very thin lenses, since the edge of the opening reflects some of the light which disturbs the crispness of vision. The objective of this invention is to allow the wearer to keep both eyes open which peering through the sights. This eliminates or greatly reduces the eye strain which develops when sighting in the usual manner, with one eye closed to focus more intently on the target. Further, by reducing the field of vision by means of a tiny hole, the concentration is much more intense. When sighting with one eye closed, the facial muscles are easily fatigued and the eyes become strained. The opaque lenses permit both eyes to remain open throughout the sighting and firing process. Without such a device, some people resort to placing one hand in front of the eye to block out the vision while it remains open.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the Unites States is as follows:

1. A pair of glasses for use in conjunction with shooting a gun, the glasses aiding in aiming at a target, the glasses comprising, in combination:

a lens comprised of three components, a rearmost component, a foremost component and an intermediate component, each of the components having a first and a second side, each of the sides having an upper edge, a lower edge and an outermost edge;

a first circular aperture having a diameter is formed within the first side of the intermediate lens component, a second circular aperture having a diameter is formed within the second side of the intermediate lens component, a first passage leading from the outermost edge of the first side lens component to the first circular aperture of the first side, a second passage leading from the outermost edge of the second side lens component to the circular second aperture of the second side;

an opaque paddle member having a circular portion and a handle portion, the opaque paddle member positioned within the first side of the intermediate lens component, the diameter of the circular portion of the paddle member being smaller than the diameter of the circular first aperture, the opaque paddle member being positioned such that the circular portion is disposed within the circular first aperture and the handle portion is positioned within the first passage, the opaque paddle member being slidably positionable within the circular first aperture by way of the handle portion;

an opaque apertured paddle member having a circular portion with an aperture formed therein and a handle portion, the apertured paddle member positioned within the second side of the intermediate lens component, the diameter of the circular portion of the apertured paddle member being smaller than the diameter of the circular second aperture, the apertured paddle member is positioned such that the circular portion is disposed within the circular second aperture and the handle portion is positioned within the second passage, the apertured paddle member being slidably positionable within the circular second aperture by way of the handle portion.

2. A pair of glasses for use in conjunction with shooting a gun, the glasses aiding in aiming at a target, the glasses comprising, in combination:

a lens component having a first and a second side, each of the sides having an upper edge, a lower edge and an outermost edge;

a first aperture having a diameter is formed within the first side of the intermediate lens component, a second aperture is formed within the second side of the intermediate lens component, a first passage leading from the outermost edge of the first side lens component to the first aperture of the first side, a second passage leading from the outermost edge of the second side lens component to the circular second aperture of the second side lens component to the aperture of the second side;

an opaque paddle member having a major portion and a handle portion, the opaque paddle member positioned within the first side of the lens component, the major portion of the paddle member being smaller than the first aperture of the first side of the lens component, the opaque paddle member being positioned such that the major portion is disposed within the first aperture of the first side and the handle portion is positioned within the first passage, the opaque paddle member being slidably positionable within the first aperture of the first side by way of the handle portion;

an apertured paddle member having a major portion with an aperture formed therein and a handle portion, the apertured paddle member positioned within the second side of the lens component, the major portion of the paddle member being smaller than the second aperture of the second side, the apertured paddle member being positioned such that the major portion is positioned within the second aperture of the second side and the handle portion is positioned within the second passage, the apertured paddle member being slidably positionable within the circular aperture by way of the handle portion.

3. The glasses as described in claim 2 wherein:

the lens is comprised of three components, a foremost component, a rearmost component and an intermediate component.

4. The glasses as described in claim 2 wherein:

the aperture of the first side is circular, the aperture of the second side is circular, the major portion of the opaque paddle is circular, and the major portion of the apertured paddle is circular.

* * * * *